March 5, 1957
A. RASCH
2,783,773
REPLACEMENT FOR FAUCET VALVES
Filed Nov. 30, 1953
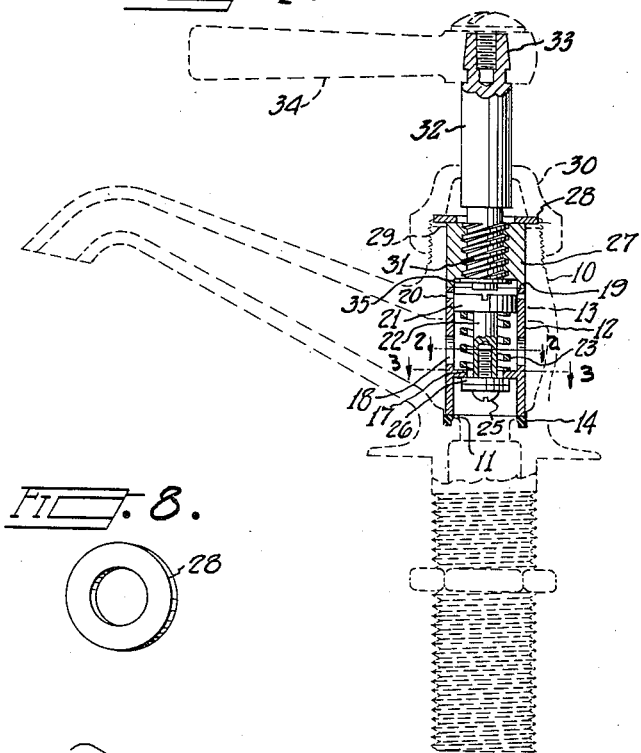
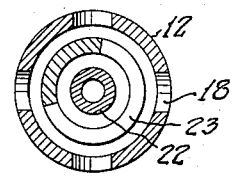
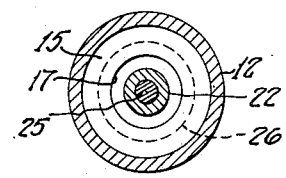
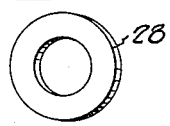
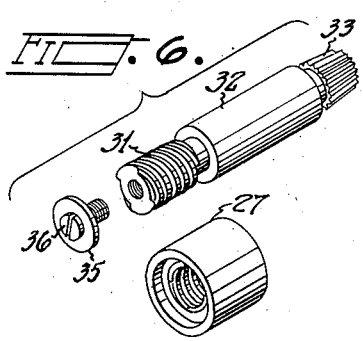
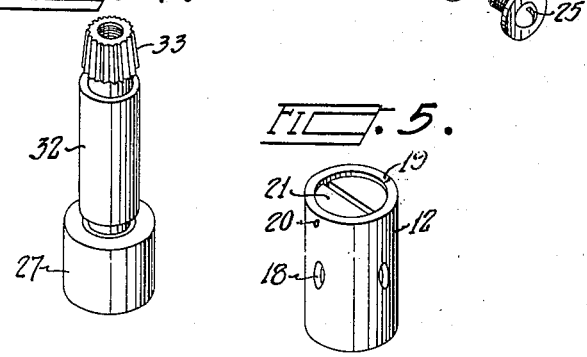
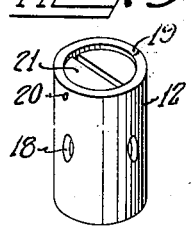
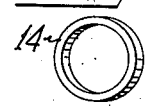
INVENTOR
ALBERT RASCH
BY *[signature]*
ATTORNEY

United States Patent Office 2,783,773
Patented Mar. 5, 1957

2,783,773
REPLACEMENT FOR FAUCET VALVES

Albert Rasch, Portland, Oreg.

Application November 30, 1953, Serial No. 395,096

1 Claim. (Cl. 137—454.6)

This invention relates generally to plumbing supplies and particularly to a replacement for faucet valves, which opens manually but is actuated in a closing direction by water pressure.

The main object of this invention is to provide a replacement valve for water faucets, which will be insertable into any standard faucet and which cannot be injured by excessive movement in a closing direction.

The second object is to make it possible to salvage a valve, which requires reseating or has passed the reseating stage, and also to eliminate the need for repeated renewals of the sealing washers.

The third object is to make the application of the valve a simple operation, requiring only a screwdriver and wrench.

I accomplish these and other objects in the manner set forth in the following specification as illustrated in the accompanying drawing, in which:

Fig. 1 is a vertical section of the device.
Fig. 2 is a section taken along the line 2—2 in Fig. 1.
Fig. 3 is a section taken along the line 3—3 in Fig. 1.
Fig. 4 is a perspective view of the assembled upper unit.
Fig. 5 is a perspective unit of the assembled lower unit.
Fig. 6 is an exploded view of Fig. 4.
Fig. 7 is an exploded view of Fig. 5.
Fig. 8 is a perspective view of the washer.
Fig. 9 is a perspective view of the gasket.

Like numbers of reference refer to the same or similar parts throughout the several views:

Referring in detail to the drawing there is shown, in dotted lines, the body 10 of the usual form of faucet, in which is formed a seat 11, which must be maintained smooth and even to prevent abrasion of the washer, which normally seats thereon. Small pieces of sand and other substances often become imbedded in the valve seat or washer and injure one or both members, causing the faucet to leak and requiring still more pressure to be applied to the valve washer until the washer requires replacement, or the valve requires reseating, which in most cases require the service of a plumber.

Referring to my invention, I have provided a tubular plug 12 which fits into the bore 13 of the faucet and rests on the gasket 14, which fits around the outer side of the seat 11.

The plug 12 has an internal flange 15 whose under side 16 is the valve seat. The central hole 17 must be large enough to provide clearance for the water when the operating stem occupies the hole 17.

Through the walls of the plug 12, between the flange 15 and the middle of the plug length, are the ports 18. Near the opposite end 19 of the plug 12 are the small holes 20 to facilitate the withdrawal of the plug 12.

Inserted into the plug end 19 is the slotted head 21 of a stem 22 which carries a spring 23, and the stem end 24, which extends through the hole 17, is tapped to receive a screw 25, which holds the valve washer 26.

Also in the bore 13 is placed a plug nut 27, which is held down by a metal ring 28, which is spaced from the adjacent faucet face 29 and held by the faucet nut 30. Into the nut 27 is threaded the threaded end 31 of the valve shank 32 whose fluted tapered end 33 receives the usual lever 34. A washer 35 held on the threaded end 31 by a screw 36 prevents the shank 32 from being withdrawn from the nut 27.

It will be noted in Fig. 1 that when the lever 34 is in the "off" position, the valve washer 26 engages the seat 16, due to the action of the spring 23, and the pressure of water in the system. It will also be seen there is a space between the screw 36 and the head 21 when the valve is closed.

This construction makes it impossible to injure the valve by means of the lever 34.

Many faucets of this type have been constructed in the past, a good example of which is that of Samaras, 2,159,452, May 23, 1939, who uses similar parts but differs from the applicant's device in that it cannot be adapted to any faucet but requires an alteration of the faucet. The applicant's device, on the other hand, is adapted to any faucet of the same size, and therein lies the major advantage of this invention. Greater ease of manufacture and freer flow of water, as well as greater accessibility are in favor of the present invention.

I claim:

In a faucet having a faucet body with an annular valve seat therein and a faucet nut thereon, a valve replacement comprising a tubular cylindrical plug of uniform internal and external diameter, a gasket between one end of said plug and said faucet valve seat, an annular flange on the inside of said plug intermediate its ends, outlet ports in said plug between said flange and the other end of the plug, a valve stem in said plug having a valve washer in said one end of said plug and a head in the other end of said plug, a compression spring on said stem between said head and said flange for urging said washer against said flange, a nut having a cylindrical external surface of the same diameter as said plug abutting said other end of said plug, a ring secured by said faucet nut for retaining said cylindrical nut, a handle stem threaded in said cylindrical nut and having an inner end arranged to bear against said head to unseat said washer from said flange when the handle stem is turned, and a washer secured on said inner end of said handle stem to prevent withdrawal of said handle stem from said cylindrical nut.

References Cited in the file of this patent

UNITED STATES PATENTS

| | | |
|---|---|---|
| 1,494,543 | Hazeltine | May 20, 1924 |
| 1,589,288 | Hansen | June 15, 1926 |
| 2,508,843 | Semak | May 23, 1950 |